(12) United States Patent
Anders et al.

(10) Patent No.: US 10,884,885 B2
(45) Date of Patent: Jan. 5, 2021

(54) PROACTIVELY PREDICTING FAILURE IN DATA COLLECTION DEVICES AND FAILING OVER TO ALTERNATE DATA COLLECTION DEVICES

(71) Applicant: INTERNATIONAL BUSINESS MACHINES CORPORATION, Armonk, NY (US)

(72) Inventors: Kelley Anders, East New Market, MD (US); Jeremy R. Fox, Georgetown, TX (US); Jonathan Dunne, Dungarvan (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 15/825,640

(22) Filed: Nov. 29, 2017

(65) Prior Publication Data
US 2019/0163588 A1 May 30, 2019

(51) Int. Cl.
*G06F 11/00* (2006.01)
*G06F 11/20* (2006.01)
(Continued)

(52) U.S. Cl.
CPC ...... *G06F 11/2069* (2013.01); *G06F 11/2025* (2013.01); *G06F 11/2066* (2013.01); *G06F 11/1658* (2013.01); *G06F 11/3006* (2013.01)

(58) Field of Classification Search
CPC .......... G06F 11/2069; G06F 11/2025; G06F 11/2066; G06F 11/1658; G06F 11/3006
See application file for complete search history.

(56) References Cited

U.S. PATENT DOCUMENTS 5,828,583 A * 10/1998 Bush ..................... G06F 11/004
702/185
9,176,819 B2 11/2015 Stergiou et al.
(Continued)

FOREIGN PATENT DOCUMENTS

CN     104964397    10/2015
WO     2017044153    3/2017

OTHER PUBLICATIONS

Guest, Idiot proof hot swap backup system, Sep. 15, 2005, https://forums.tomshardware.com/, 17 pages. (Year: 2005).*
(Continued)

*Primary Examiner* — Katherine Lin
(74) *Attorney, Agent, or Firm* — Jay Wahlquist; Andrew D. Wright; Roberts Calderon Safran & Cole, P.C.

(57) ABSTRACT

A computer-implemented method includes: detecting, by a computing device, a failure event for a primary data collection device that is currently collecting and providing data; discontinuing, by the computing device, use of the primary data collection device based on the detecting the failure event; selecting, by the computing device, an alternate data collection device based on the discontinuing the use of the primary data collection device; receiving, by the computing device, data collected by the alternate data collection device; receiving, by the computing device, failure related data associated with the primary data collection device after discontinuing use of the primary data collection device; and updating, by the computing device, a hazard function based on the failure related data, wherein the hazard function is used to detect future failures of a same type of primary data collection device.

18 Claims, 8 Drawing Sheets

(51) Int. Cl.
G06F 11/16 (2006.01)
G06F 11/30 (2006.01)

(56) References Cited

U.S. PATENT DOCUMENTS

| | | |
|---|---|---|
| 9,189,309 B1 | 11/2015 | Ma et al. |
| 9,612,896 B1 | 4/2017 | Traylor et al. |
| 9,639,589 B1 * | 5/2017 | Theimer ................. G06F 16/27 |
| 2004/0048507 A1 | 3/2004 | Hage |
| 2016/0098309 A1 | 4/2016 | Kim |
| 2016/0146709 A1 | 5/2016 | Dey et al. |
| 2017/0063605 A1 | 3/2017 | Cheng et al. |
| 2017/0091870 A1 | 3/2017 | Trainor et al. |
| 2017/0160110 A1 * | 6/2017 | Basu ........................ G01D 1/16 |
| 2017/0164293 A1 | 6/2017 | Hwang |
| 2017/0322816 A1 * | 11/2017 | Parthiban .............. G06F 9/4401 |

OTHER PUBLICATIONS

Ying et al., "Message Scheduling Scheme Considering Node Failure for Internet of Things", Computer Engineering, vol. 42, No. 11, pp. 32-7, 2016, 6 pages.

Mell et al., "The NIST Definition of Cloud Computing", NIST, Special Publication 800-145, Sep. 2011, 7 pages.

* cited by examiner

PROACTIVELY PREDICTING FAILURE IN DATA COLLECTION DEVICES AND FAILING OVER TO ALTERNATE DATA COLLECTION DEVICES

BACKGROUND

The present invention generally relates to proactively predicting failure of data collection devices, and more particularly, to dynamically optimizing functions used to accurately predict failure and failing over to alternate data collection devices once a failure of a primary data collection device is detected.

Data collection devices, (e.g., Internet-of-Things (IoT) sensors, Machine-to-Machine (M2M) sensors, environmental sensors, object/proximity sensors, etc.), are often utilized on buildings and/or similar structures. Data collection devices are commonly used to monitor various parameters for building maintenance, fire, flood, emergency detection, object detection, etc. Data collection devices may be implemented in outdoor and/or other areas in which they may be susceptible to damage over time.

SUMMARY

In an aspect of the invention, a computer-implemented method includes: detecting, by a computing device, a failure event for a primary data collection device that is currently collecting and providing data; discontinuing, by the computing device, use of the primary data collection device based on the detecting the failure event; selecting, by the computing device, an alternate data collection device based on the discontinuing the use of the primary data collection device; receiving, by the computing device, data collected by the alternate data collection device; receiving, by the computing device, failure related data associated with the primary data collection device after discontinuing use of the primary data collection device; and updating, by the computing device, a hazard function based on the failure related data, wherein the hazard function is used to detect future failures of a same type of primary data collection device.

In an aspect of the invention, there is computer program product for proactively detecting failure of a primary data collection device. The computer program product comprises a computer readable storage medium having program instructions embodied therewith, the program instructions executable by a computing device to cause the computing device to: monitor failure related data associated with a primary data collection device that is currently collecting sensor data; generate a hazard function based on the monitoring the failure related data; detect a failure event for the primary data collection device based on the hazard function; discontinue use of the primary data collection device based on the detecting the failure event; select an alternate data collection device based on the discontinuing the use of the primary data collection device; receive sensor data collected by the alternate data collection device; continue to monitor and receive failure related data associated with the primary data collection device after discontinuing use of the primary data collection device; and update the hazard function based on the failure related data.

In an aspect of the invention, a system includes a CPU, a computer readable memory and a computer readable storage medium associated with a primary data collection device; program instructions to collect sensor data using one or more sensors; program instructions to provide the collected sensor data; program instructions to provide failure related data to cause a data collection management server to generate a hazard function based on the failure related data; program instructions to receive an instruction to discontinue the collecting sensor data, wherein the instruction is received from the data collection management server based on data collection management server detecting a failure event using the failure related data and the hazard function; program instructions to discontinue the collecting sensor data based on receiving the instruction to discontinue the collecting sensor data; program instructions to continue to provide the failure related data after receiving the instruction to discontinue the collecting sensor data. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
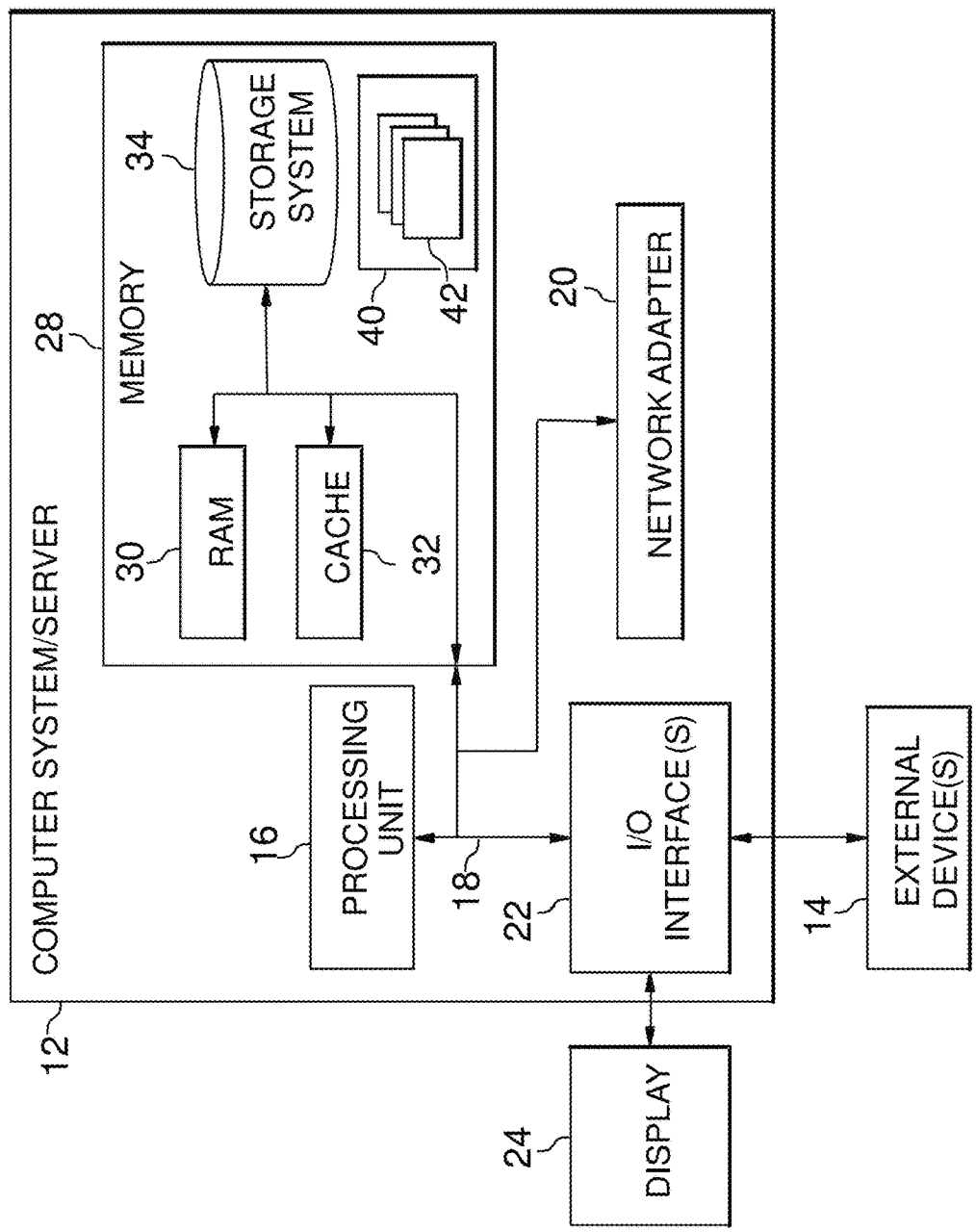
FIG. 1 depicts a cloud computing node according to an embodiment of the present invention.

The present invention generally relates to proactively predicting failure of data collection devices, and more particularly, to dynamically optimizing functions used to accurately predict failure and failing over to alternate data collection devices once a failure of a primary data collection device is detected. Data collection devices may be implemented in outdoor and/or other areas in which they may be susceptible to damage over time. Accordingly, aspects of the present invention may proactively predict a failure event (e.g., when a primary data collection device is to likely to fail), discontinue collection of data from the primary data collection device based on predicting the failure event, and select an alternate data collection device (e.g., a user device) to resume data collection without interruption. Further, aspects of the present invention may continue to collect failure-related data (e.g., data indicating the health/status of the primary data collection device) to generate, update, and refine a hazard function that more accurately predicts a failure event. As such, over time, the hazard function will continue to be optimized to reduce the chances of a malfunctioning primary data collection device from providing potentially inaccurate data.

In embodiments, aspects of the present invention may select an alternate data collection device to temporarily collect data while a collection of data from the primary data collection device is discontinued (e.g., until the primary data collection device can be repaired or replaced). In embodiments, aspects of the present invention may monitor alternate data collection devices that are within a geofenced area, determine the capabilities of the alternate data collection devices, and select one or more alternate data collection devices to serve as a substitute for a primary data collection device that has failed or is anticipated to fail.

As described herein, aspects of the present invention may proactively predict when a primary data collection device is expected to fail based on a hazard function and cadence signals received from the primary data collection device. The hazard function may be based on prior failure data of a similar type of primary data collection device. In embodiments, the failure data may include a mean time to failure, which may be derived from a time when a primary data collection device was placed in service to the time when the primary data collection device failed. In embodiments, the primary data collection device may send a signal (e.g., an "SOS" signal) indicating that the primary data collection device is about to fail. Additionally, or alternatively, the cadence signals may be used to determine that the primary data collection device is about to fail when the timing and/or patterns of the cadence signals deviates from an expected timing and/or failure distribution norms to a threshold degree. As described herein, cadence signal deviations may indicate that a primary data collection device is not collecting data within normal parameters.

In embodiments, aspects of the present invention may discontinue use of the primary data collection device (and failover to an alternate data collection device) when proactively predicting that the primary data collection device is expected to fail (e.g., using a hazard function and cadence signals). In the case when insufficient failure data exists and thus a hazard function does not exist for the same type of primary data collection device, aspects of the present invention may discontinue use of the primary data collection device (and failover to an alternate data collection device) when the SOS signal has been received. If a failure is proactively predicted based on the hazard function and cadence signals, aspects of the present invention may discontinue use of the primary data collection device (and failover to an alternate data collection device), but may still continue to monitor for cadence signal deviations and/or SOS signals to determine when the primary data collection device actually fails. Further, aspects of the present invention may incorporate the failure data into the hazard function to update, refine, and improve the hazard function so that the updated hazard function is used to more accurately predict future failures of the same type of primary data collection device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
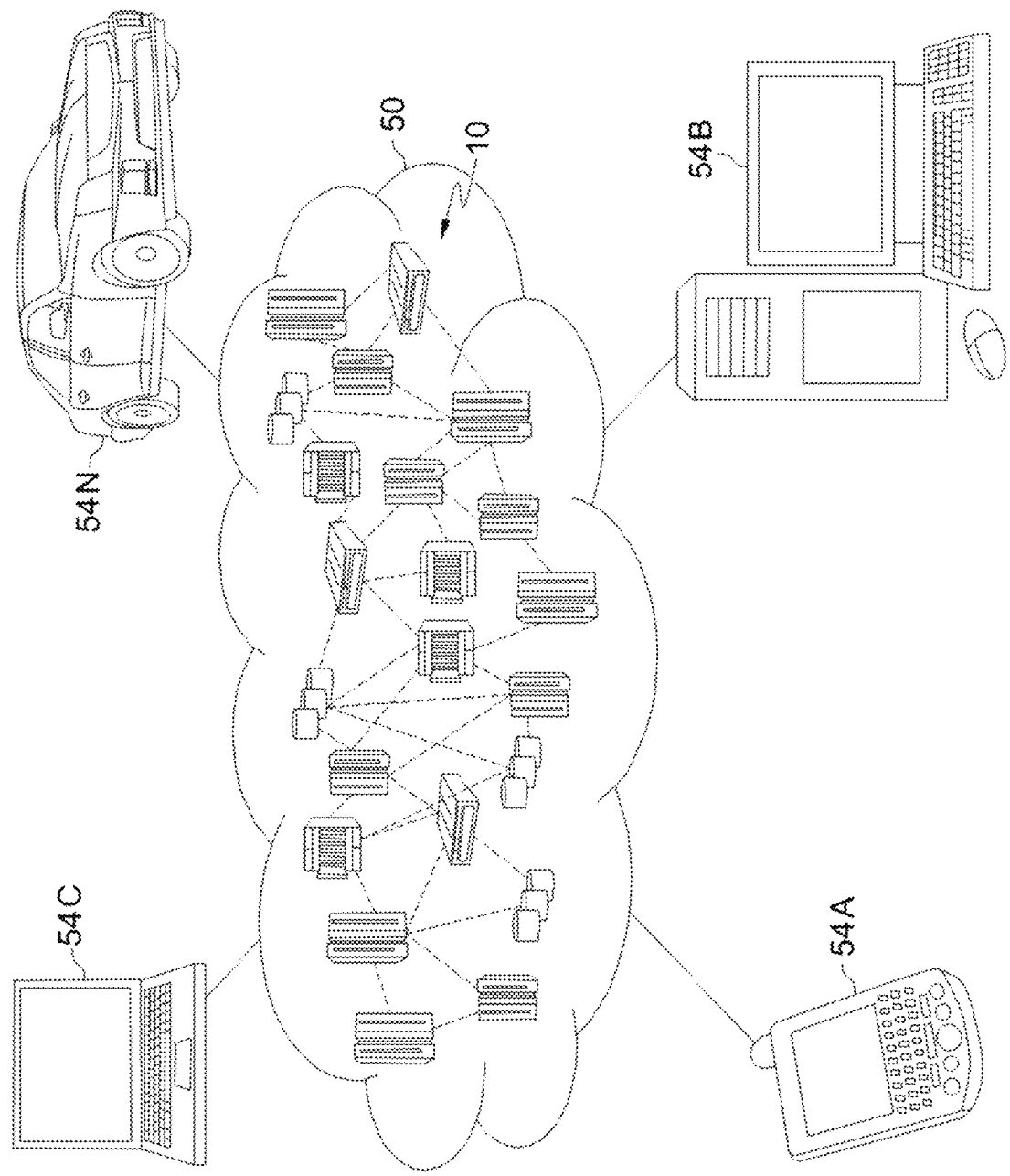
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
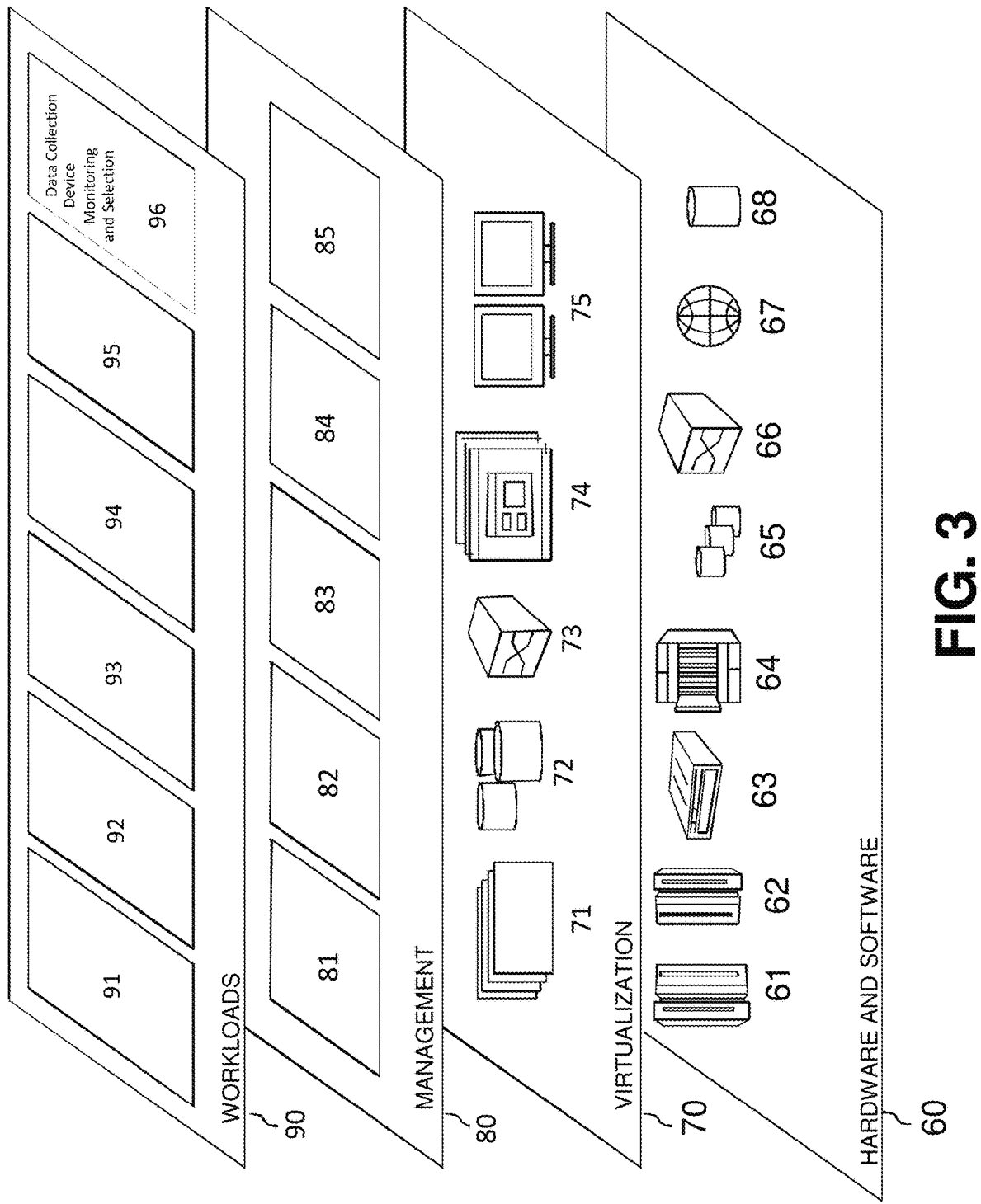
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data collection device monitoring and selection 96.

Referring back to FIG. 1, the program/utility 40 may include one or more program modules 42 that generally carry out the functions and/or methodologies of embodiments of the invention as described herein (e.g., such as the functionality provided by data collection device monitoring and selection 96). Specifically, the program modules 42 may monitor cadence and/or SOS signals from a primary data collection device, generate a hazard function based on the cadence and/or SOS signals, detect a failure event, discontinue use of the primary data collection device, select an alternate data collection device, update a hazard function based on the failure event data, receive indication of a replacement primary data collection device, and discontinue use of the alternate data collection device and begin use of the replacement primary data collection device. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a data collection management server as shown in FIG. 4.

Figure 4:
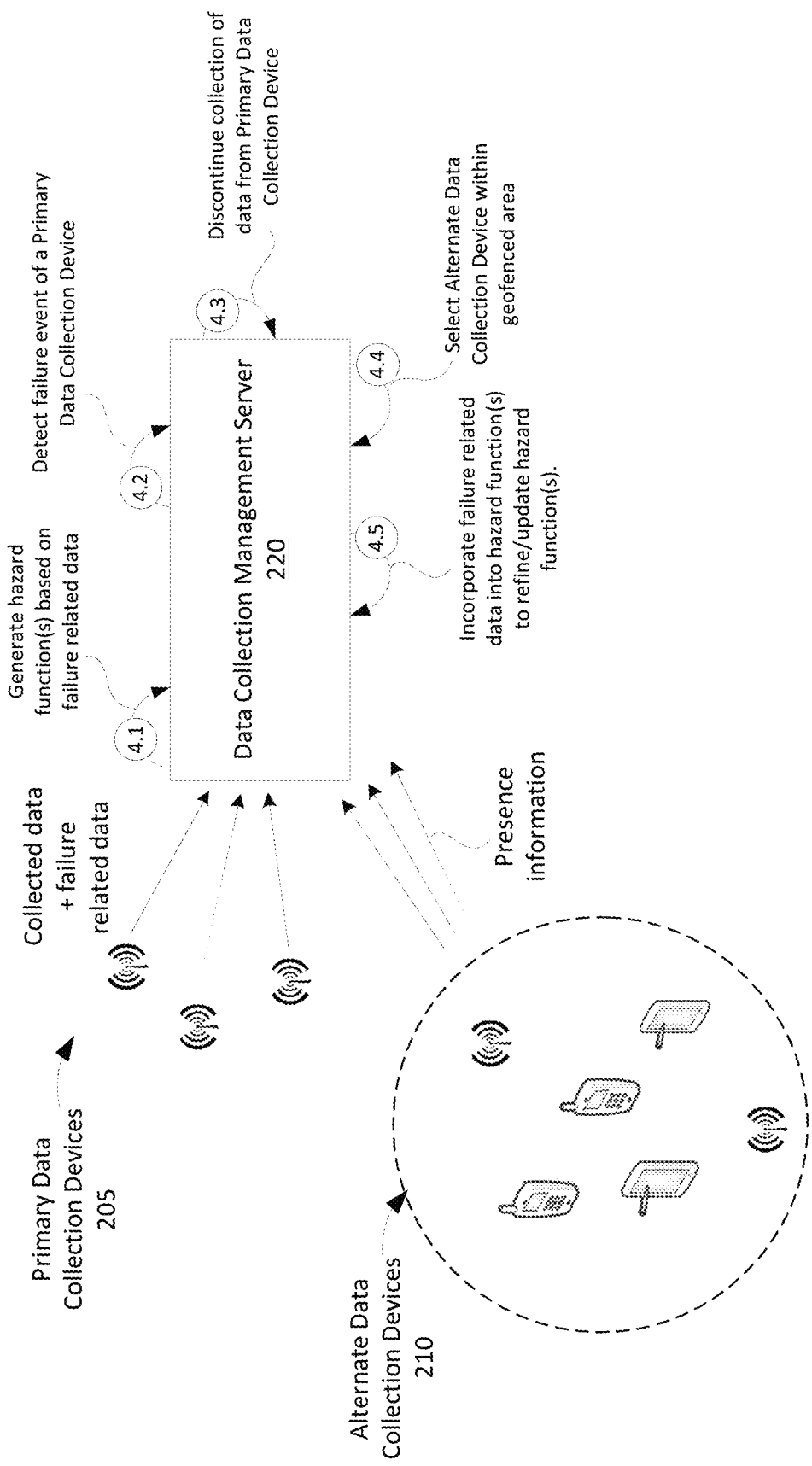
FIG. 4 shows an overview of an example implementation in accordance with aspects of the present invention.

FIG. 4 shows an overview of an example implementation in accordance with aspects of the present invention. As shown in FIG. 4, primary data collection devices 205 may provide collected data (e.g., data collected by one or more sensors implemented by the primary data collection devices 205). The primary data collection devices 205 may also provide failure related data to a data collection management server 220. In embodiments, the collected data may include any variety of data that the primary data collection devices 205 are configured to collect (e.g., temperature, objects, smoke, flood, etc.). Each primary data collection device 205 may also provide failure related data that indicates when the primary data collection device 205 has failed or when failure is imminent. In particular, each primary data collection device 205 may provide cadence signals that include a "heart beat" or similar type of signal indicating that the primary data collection device 205 is functioning properly. In embodiments, each primary data collection device 205 may be configured to provide a cadence signal at a particular time interval and/or in accordance with a preconfigured pattern. Also, each primary data collection device 205 may be configured to provide an SOS signal when the primary data collection device 205 has failed. For example, the primary data collection device 205 may include any suitable failure detection application that triggers the SOS signal when a failure of the primary data collection device 205 has occurred. The data collection management server 220 may continue to receive failure related data throughout the processes described herein.

At step 4.1, the data collection management server 220 may generate a hazard function based on the failure related data (e.g., based on the cadence signals, the SOS signals, and/or manufacturer failure data). In embodiments, the hazard function may indicate a mean time to failure for a primary data collection device 205. In embodiments, the hazard function may already exist from prior failure data, and the failure related data, as it is received, may be incorporated into the hazard function used to update and/or refine the hazard function. In embodiments, the hazard function may also identify the expected interval or pattern of the cadence signals (e.g., the duration of the cadence signals and the pattern of the duration of the cadence signals). As cadence signals are received, an initial hazard function may be modified to create an augmented hazard function that more accurately predicts the mean time to failure of a primary data collection device 205.

At step 4.2, the data collection management server 220 may detect a failure event of a primary data collection device 205. For example, the data collection management server 220 may proactively detect the failure event based on the cadence signals deviating, to a threshold degree, from an expected timing and/or failure distribution pattern (e.g., in which the expected timing, pattern, and/or duration is preconfigured and/or is incorporated into the hazard function). Additionally, or alternatively, the data collection management server 220 may proactively detect the failure event based on a mean time to failure identified in the hazard function and/or augmented hazard function. Additionally, or alternatively, the data collection management server 220 may detect the failure event based on receiving an SOS signal from the primary data collection device 205.

At step 4.3, the data collection management server 220 may discontinue collection of the data from the primary data collection device 205. For example, the data collection management server 220 may discontinue receiving the data collected from the primary data collection device 205 (e.g., sensor data) based on detecting a failure event on the primary data collection device 205. In this way, the data collection management server 220 may discontinue receiving data from a failing or failed primary data collection device 205 that may be inaccurate.

At step 4.4, the data collection management server 220 may select an alternate data collection device 210 to resume the collection of data. For example, the data collection management server 220 may select an alternate collection device 210 based on presence information received from a plurality of alternate collection devices 210 located within a particular geofenced area (e.g., an area in which data collection from an alternate data collection devices 210 would closely mirror that of data collection from the failed primary data collection device 205). In embodiments, the presence information may identify a location of alternate data collection devices 210 within the geofenced area. Additionally, or alternatively, the presence information may identify the alternate collection devices 210 that are present in the geofenced area, as well as the data collection capabilities/permissions of each alternate data collection devices 210. Based on the presence information, the data collection management server 220 may select a particular alternate data collection device 210 to serve as a temporary data collector for the failed primary data collection device 205. The data collection management server 220 may select a particular alternate data collection devices 210 based on its location and its data collecting capabilities. For example, the data collection management server 220 may select an alternate data collection device 210 whose location closely matches that of the failed primary data collection device 205, and whose data collection capabilities match those of the failed primary data collection device 205).

At step 4.5, the data collection management server 220 may incorporate the failure related data into the hazard function to refine and update the hazard function. If a failure event was detected proactively (e.g., based on a hazard function and/or cadence signals indicating that the primary data collection device 205 was within a certain time of failing), the data collection management server 220 may continue to monitor the primary data collection device 205 for cadence signals and/or SOS signals indicating that the primary data collection device 205 has failed. Once the primary data collection device 205 has actually failed, the data collection management server 220 may incorporate the time to failure into the hazard function, thereby refining the hazard function to improve the accuracy of future predictions of failure for the same type of primary data collection device 205.

Figure 5:
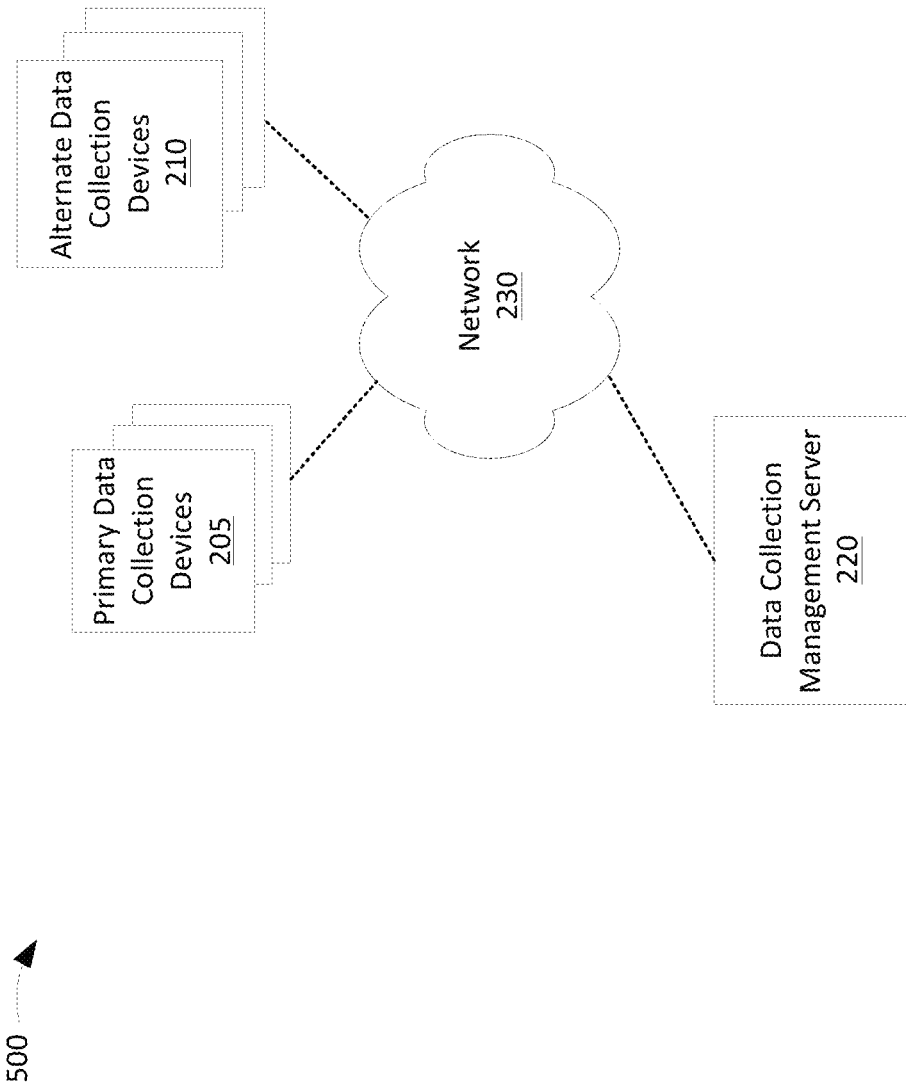
FIG. 5 shows an example environment in accordance with aspects of the present invention.

FIG. 5 shows an example environment in accordance with aspects of the present invention. As shown in FIG. 5, environment 500 may include primary data collection devices 205 (referred to singularly as "a primary data collection device 205"), alternate collection devices 210 (referred to singularly as "an alternate data collection device 210" or in the plural as "alternate data collection devices 210"), a data collection management server 220, and/or network 230. The devices in FIG. 5 may correspond to those described in FIG. 4. In embodiments, one or more components in environment 500 may correspond to one or more components in the cloud computing environment of FIG. 2. In embodiments, one or more components in environment 500 may include the components of computer system/server 12 of FIG. 1.

The primary data collection devices 205 may include one or more devices having one more sensors that collect data (e.g., sensor data), and are capable of providing the collected sensor data via a network, such as the network 230. For example, the primary data collection devices 205 may include Internet-of-Things (IoT) devices, Machine-to-Machine (M2M) devices, environmental sensors, object/proximity sensors, fluid sensors, etc. In embodiments, each primary data collection device 205 may be configured with an application that detects that a failure of the device itself has occurred and that sends SOS signals based on detecting that the failure has occurred. In embodiments, each primary data collection device 205 may be configured to send a cadence signal of a particular duration at a particular interval or pattern.

The alternate data collection device 210 may include a computing device capable of communicating via a network, such as the network 235. For example, each alternate data collection device 210 may correspond to a mobile communication device (e.g., a smart phone or a personal digital assistant (PDA)), a portable computer device (e.g., a laptop or a tablet computer), or another type of device. In embodiments, the alternate data collection device 210 may include a satellite device. In some embodiments, each alternate data collection device 210 may be used to temporarily collect data when a failure event has been detected on a primary data collection device 205. In embodiments, users of each alternate data collection device 210 may opt-in or opt-out to allow their alternate collection device 210 to be used to temporarily collect data. Also, the alternate data collection device 210 may collect similar data as that of a primary data collection device 205 such that data collection is not compromised when the alternate data collection device 210 is used for data collection instead of the primary data collection device 205.

The data collection management server 220 may include one or more computing devices (e.g., such as computer system/server 12 of FIG. 1) that monitors presence signals of the alternate collection device 210, detects failure events on a primary data collection device 205 based on cadence and/or SOS signals, generates/updates hazard functions for the primary data collection device 205, and selects one or more alternate collection devices 210 to collect data when a failure event has been detected on the primary data collection device 205. In embodiments, the data collection management server 220 may continue to monitor the presence of the alternate collection devices 210 with in a geofenced area, and may select one or more alternate collection devices 210 to collect data when those alternate collection devices 210 are within the geofenced area.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
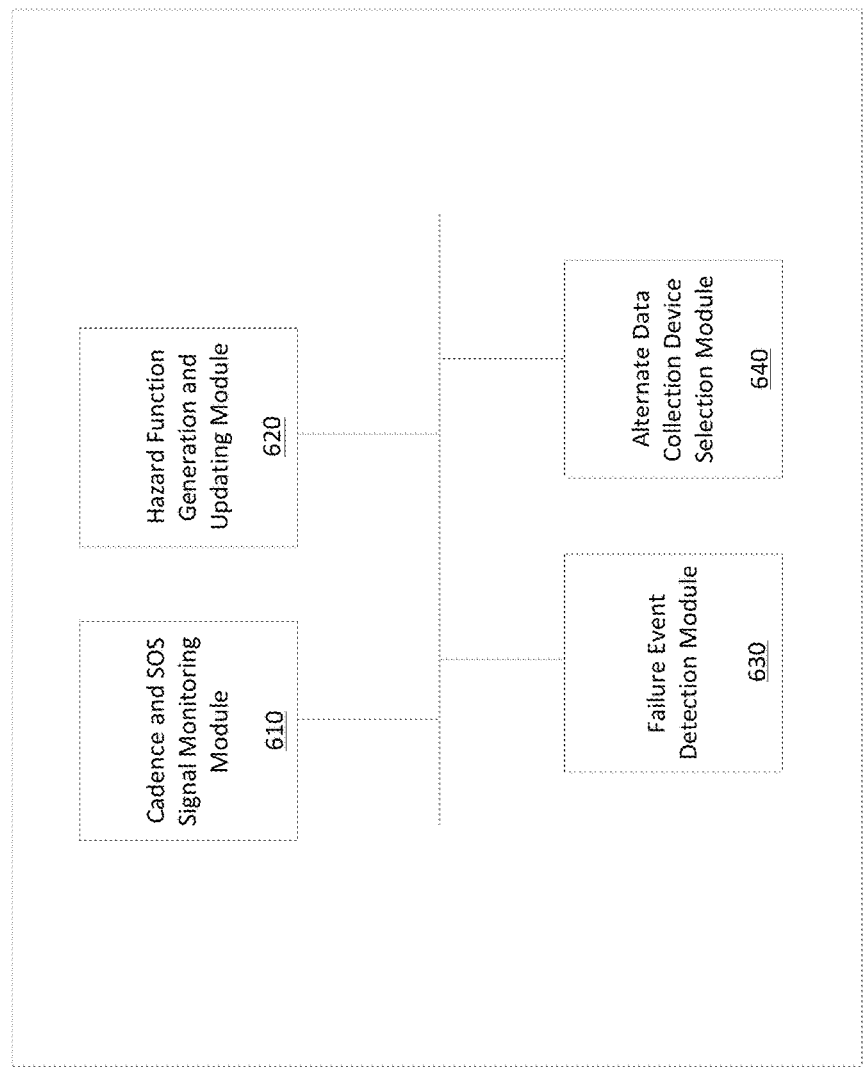
FIG. 6 shows a block diagram of example components of a data collection management server in accordance with aspects of the present invention.

FIG. 6 shows a block diagram of example components of a data collection management server 220 in accordance with aspects of the present invention. As shown in FIG. 6, the data collection management server 220 may include a cadence and SOS signal monitoring module 610, a hazard function generation and updating module 620, a failure event detection module 630, and an alternate data collection device selection module 640. In embodiments, the data collection management server 220 may include additional or fewer components than those shown in FIG. 6. In embodiments, separate components may be integrated into a single computing component or module. Additionally, or alternatively, a single component may be implemented as multiple computing components or modules.

The cadence and SOS signal monitoring module 610 may include a program module (e.g., program module 42 of FIG. 1) that receives and monitors cadence and SOS signals from the primary data collection devices 205. In embodiments, the cadence and SOS signals may be received throughout the processes described herein (e.g., after a failure event has been detected).

The hazard function generation and updating module 620 may include a program module (e.g., program module 42 of FIG. 1) that generates one or more hazard functions for a primary data collection device 205 (e.g., an initial hazard function and an augmented hazard function). In embodiments, the hazard function generation and updating module 620 may generate an initial hazard function based on prior failure data (e.g., manufacturer failure data, prior SOS signals received, prior cadence signal deviations, etc.). The hazard function generation and updating module 620 may generate an augmented hazard function based on detecting cadence signal deviations from previously established failure distribution norms. As described herein, cadence signal deviations may indicate that a primary data collection device 205 is not collecting data within normal parameters. As described herein, the augmented hazard function may more accurately model and predict a mean time to failure for the primary data collection device 205 than the initial hazard function. In embodiments, the hazard functions (e.g., initial and/or augmented hazard functions) may be determined by measuring a failure rate of the primary data collection device 205, determining an underlying distribution of the failure rate data, determining a survivor function, and dividing a probability density function of the error rate by a cumulative density function of the error rate. Additionally, or alternatively, other hazard function modeling techniques may be used in which the hazard function is based on underlying failure data.

As described herein, the hazard function generation and updating module 620 may continue to update, augment, and refine a hazard function for a primary data collection device 205 based on incoming failure data indicating when a primary data collection device 205 has failed. In this way, the hazard function may continue to be refined so that more accurate failure predictions may be proactively made in the future for other primary data collection devices 205 of the same type. As described herein, the incoming failure data may include SOS signals and/or cadence signal deviations that continue to be monitored by the cadence and SOS signal monitoring module 610.

The failure event detection module 630 may include a program module (e.g., program module 42 of FIG. 1) that detects a failure event for a primary data collection device 205 based on cadence and SOS signals monitored and received by the cadence and SOS signal monitoring module 610. Additionally, or alternatively, the failure event detection module 630 may detect a failure event based on mean time to failure, an error rate, and/or other failure data derived from an initial or augmented hazard function generated by the hazard function generation and updating module 620. In embodiments, the failure event detection module 630 may provide failure related data to the hazard function generation and updating module 620 such that the hazard function generation and updating module 620 can update a hazard function for the primary data collection device 205. Also, based on detecting a failure event for the primary data collection device 205, the failure event detection module 630 may discontinue use of the primary data collection device 205, but the cadence and SOS signal monitoring module 610 may continue to monitor and receive cadence and SOS signals for the primary data collection device 205. The failure event detection module 630 may determine, based on the continued monitoring, when the primary data collection device 205 actually fails, and the failure event detection module 630 may provide the failure data to the hazard function generation and updating module 620 such that the hazard function generation and updating module 620 may incorporate the failure data into the hazard function for refining and updating the hazard function.

The alternate data collection device selection module 640 may include a program module (e.g., program module 42 of FIG. 1) that selects an alternate data collection devices 210 to temporarily collect data when a failure event for a primary data collection device 205 has been detected. In embodiments, the alternate data collection device selection module 640 may select an alternate data collection device 210 based on location of the alternate data collection device 210. For example, the alternate data collection device selection module 640 may select an alternate data collection device 210 having a similar location as the primary data collection device 205 such that proximity-dependent data collected from the alternate data collection device 210 closely reflects the data that would be collected by a functioning primary data collection device 205. Additionally, or alternatively, the alternate data collection device selection module 640 may select an alternate data collection device 210 that has granted permission to be used for data collection purposes.

Additionally, or alternatively, the alternate data collection device selection module 640 may select an alternate data collection device 210 based on whether or not the alternate data collection devices 210 is signed in to a social networking account (e.g., in a situation where data collected should be shared via social media). Additionally, or alternatively, the alternate data collection device selection module 640 may select an alternate data collection device 210 based on the type of data that the alternate data collection devices 210 is capable of collecting in relation to the type of data that the primary data collection device 205 is configured to collect. In embodiments, the alternate data collection device selection module 640 may select a second alternate data collection device 210 to collect data when a first alternate data collection device 210 is no longer able to do so (e.g., when the first alternate data collection device 210 departs a geofenced area, when permission has been revoked to collect data, etc.). In embodiments, the alternate data collection device selection module 640 may determine that a primary data collection device 205 that experienced a failure event has been replaced or repaired, and may discontinue use of the alternate data collection devices 210 and resume use of the primary data collection device 205 to collect data.

Figure 7:
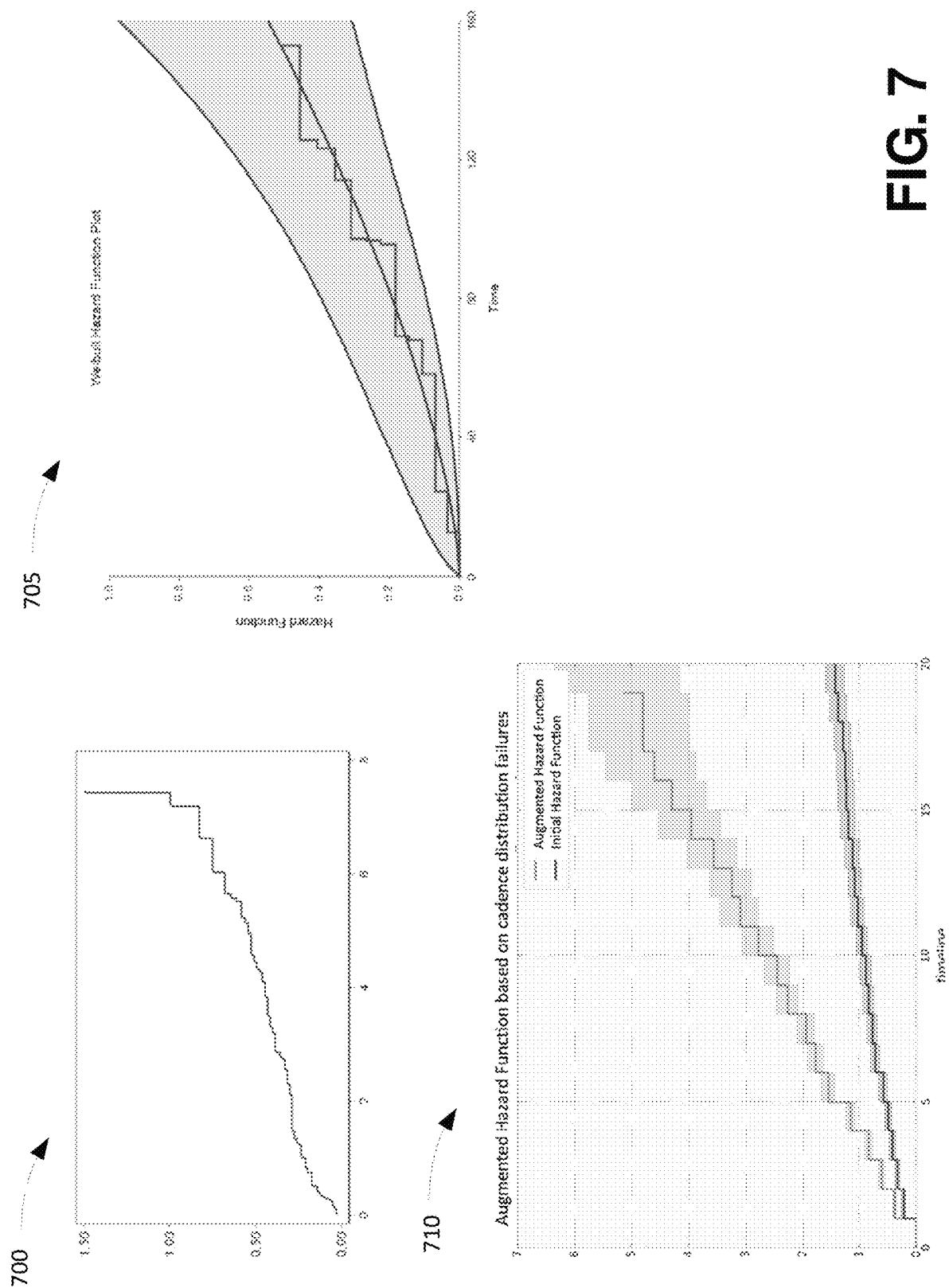
FIG. 7 shows example graphs of hazard functions that may be generated and used to predict failures of primary collection devices in accordance with aspects of the present invention.

FIG. 7 shows example graphs of hazard functions that may be generated by the data collection management server 220 and used to predict failures of primary collection devices in accordance with aspects of the present invention. In FIG. 7, an initial hazard function 700 for a primary data collection device 205 may be generated based on prior failure data (e.g., manufacturer failure data, failure detected from cadence signal deviations and/or SOS signals, etc.). The initial hazard function 700 may identify a mean time to failure and/or an error rate at various runtimes. Graph 705 shows the cadence signal patterns and failure distribution norm under which cadence signals may be encompassed to be considered operating within normal parameters. Based on deviations from the failure distribution norm, an augmented hazard function may be generated (as shown in graph 710), and that augmented hazard function 710 may be used to proactively predict a failure in a primary data collection device 205 prior to when the primary data collection device 205 would send an SOS signal after already having experienced a failure. As described herein, failure data for the primary data collection device 205 may continue to be monitored and incorporated into the augmented hazard functions to further refine and update the accuracy of the augmented hazard function.

Figure 8:
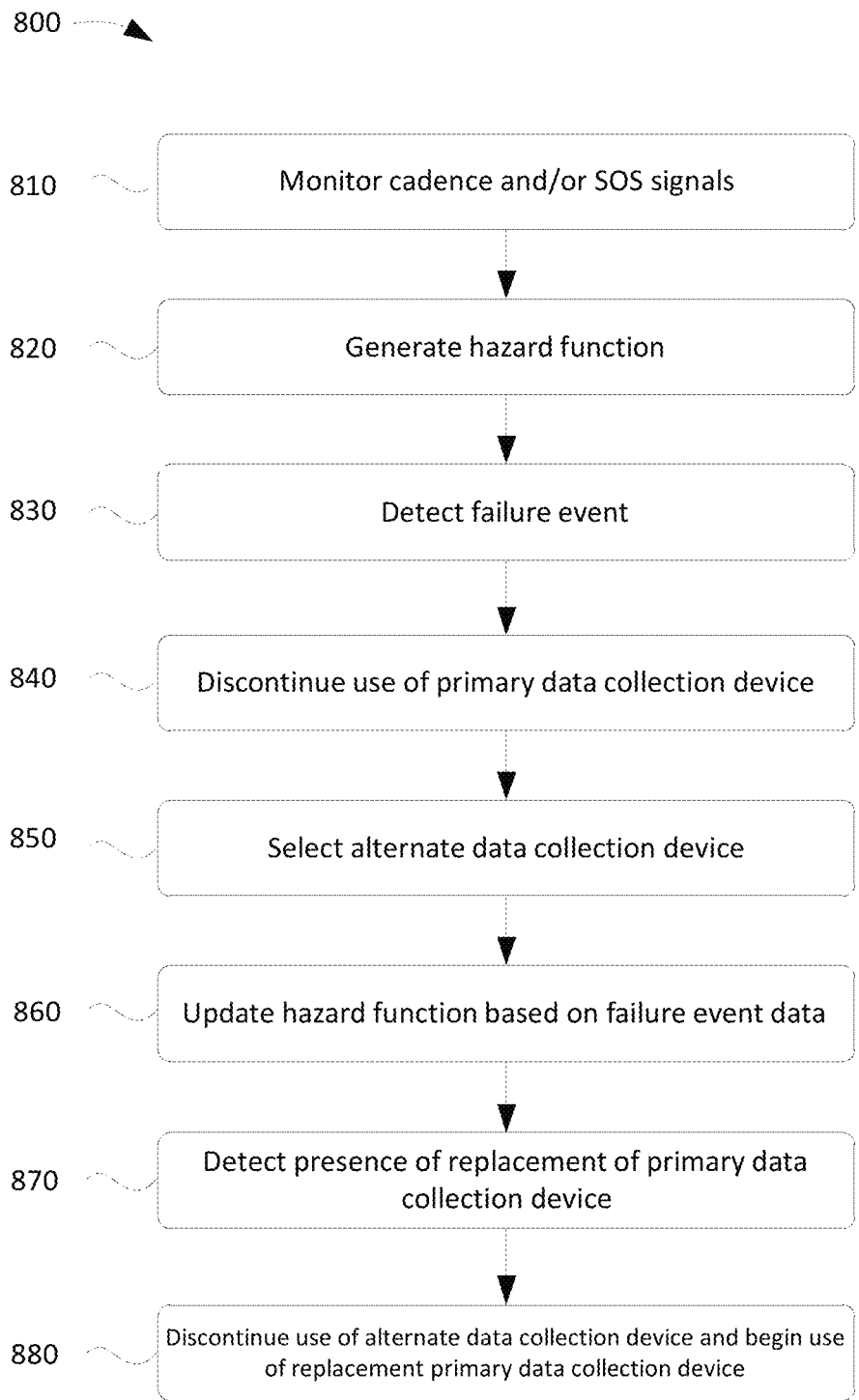
FIG. 8 shows an example flowchart of a process for generating hazard functions, proactively detecting a failure in a primary data collection device, and failing over to an alternate data collection device in accordance with aspects of the present invention.

FIG. 8 shows an example flowchart of a process for generating hazard functions, proactively detecting a failure in a primary data collection device, and failing over to an alternate data collection device in accordance with aspects of the present invention. The steps of FIG. 8 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 8, process 800 may include monitoring cadence and/or SOS signals (step 810). For example, as described above with respect to the cadence and SOS signal monitoring module 610, the data collection management server 220 may receive and monitor cadence and SOS signals from the primary data collection devices 205. In embodiments, the cadence and SOS signals may be received throughout process 800.

Process 800 may also include generating a hazard function (step 820). For example, as described above with respect to the hazard function generation and updating module 620, the data collection management server 220 may generate one or more hazard functions for a primary data collection device 205 (e.g., an initial hazard function and an augmented hazard function). In embodiments, data collection management server 220 may generate an initial hazard function based on prior failure data (e.g., manufacturer failure data, prior SOS signals received, prior cadence signal deviations, etc.). The hazard function generation and updating module 620 may generate an augmented hazard function based on detecting cadence signal deviations from previously established failure distribution norms. As described herein, cadence signal deviations may indicate that a primary data collection device 205 is not collecting data within normal parameters. As described herein, the augmented hazard function may more accurately model and predict a mean time to failure for the primary data collection device 205 than the initial hazard function.

Process 800 may further include detecting a failure event (step 830). For example, as described above with respect to the failure event detection module 630, the data collection management server 220 may detect a failure event for a primary data collection device 205 based on cadence and SOS signals monitored and received by the cadence and SOS signal monitoring module 610. More specifically, the data collection management server 220 may detect a failure event when receiving an SOS signal from the primary data collection device 205, and/or when the cadence deviations are outside of failure distribution norms greater than a threshold degree. Additionally, or alternatively, the failure event detection module 630 may detect a failure event based on mean time to failure, an error rate, and/or other failure data derived from an initial or augmented hazard function generated at step 820.

Process 800 may also include discontinuing use of the primary data collection device (step 840). For example, as described above with respect to the failure event detection module 630, the data collection management server 220 may discontinue use of the primary data collection device 205 (e.g., discontinue receiving sensor data collected by the primary data collection device 205). As descried herein, after discontinuing the use of the primary data collection device, the data collection management server 220 may continue to receive failure related data by monitoring the cadence and SOS signals transmitted by the primary data collection device 205 in accordance with step 810. In embodiments, the data collection management server 220 may discontinue use of the primary data collection device 205 by disconnecting a service channel via which the primary data collection device 205 transmits collected sensor data to the data collection management server 220. Additionally, or alternatively, the data collection management server 220 may continue to receive collected sensor data, but may simply ignore or discard the collected data. Additionally, or alternatively, the data collection management server 220 may provide a control instruction to the primary data collection device 205 to discontinue collecting and sending sensor data, but to continue to send failure related data (e.g., SOS and/or cadence signals).

Process 800 may further include selecting an alternate data collection device (step 850). For example, as described above with respect to the alternate data collection device selection module 640, the data collection management server 220 may select an alternate data collection device 210 to temporarily collect data when a failure event for a primary data collection device 205 has been detected. In embodiments, the data collection management server 220 may select an alternate data collection devices 210 based on location of the alternate data collection devices 210, whether the alternate data collection devices 210 has granted permission to be used for data collection purposes, whether the alternate data collection devices 210 is signed in to a social networking account (e.g., in a situation where data collected should be shared via social media), the type of data that the alternate data collection devices 210 is capable of collecting in relation to the type of data that the primary data collection device 205 is configured to collect, etc. In embodiments, the data collection management server 220 may select a second alternate data collection devices 210 to collect data when a first alternate data collection devices 210 is no longer able to do so (e.g., when the first alternate data collection devices 210 departs a geofenced area, when permission has been revoked to collect data, etc.). Once the alternate data collection devices 210 has been selected, the data collection management server 220 may establish a connection with the alternate data collection devices 210 (e.g., using a "handshake" process) and begin collecting data from the alternate data collection devices 210.

Process 800 may also include updating a hazard function based on failure event data (step 860). For example, as described above with respect to the hazard function generation and updating module 620, the data collection management server 220 may continue to monitor cadence and SOS signals from the primary data collection device 205 (as described at step 810) after discontinuing use of the primary data collection device 205 and selecting the alternate data collection devices 210. The data collection management server 220 may detect when a failure has actually occurred (e.g., in the event that if at step 830, the failure event was a proactive prediction of when a failure would be occurring in the future). When a failure actually occurs based on monitoring the cadence and/or SOS signals, the data collection management server 220 may incorporate the failure data into the hazard function to update and refine the hazard function.

Process 800 may further include detecting the presence of a replacement primary data collection device (step 870). For example, as described above with respect to the alternate data collection device selection module 640, the data collection management server 220 may determine that a primary data collection device 205 that experienced a failure event has been replaced or repaired. As an example, the data collection management server 220 may detect the presence of the replaced or repaired primary data collection device 205 when the replaced or repaired primary data collection device 205 is added to a network of primary data collection devices 205 connected to the data collection management server 220, and when the replaced or repaired primary data collection device 205 includes the same or similar attributes as the previously failed primary data collection device 205 (e.g., the same type of primary data collection device 205, similar type of data collected, similar location of data collection, etc.).

Process 800 may also include discontinuing the use of the alternate data collection device and begin use of replacement primary data collection device (step 880). For example, as described above with respect to the hazard function generation and updating module 620, the data collection management server 220 may discontinue use of the alternate data collection devices 210 and resume use of the repaired or replaced primary data collection device 205 to collect data. In this way, the alternate data collection devices 210 is only temporarily used for uninterrupted data collection while a primary data collection device 205 that has experienced a failure event is being repaired or replaced.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a computing device, a failure event for a primary data collection device that is currently collecting and providing data;
   discontinuing, by the computing device, use of the primary data collection device based on the detecting the failure event;
   selecting, by the computing device, an alternate data collection device to collect data from a plurality of detected or available alternate data collection devices based on the discontinuing the use of the primary data collection device;
   receiving, by the computing device, data collected by the alternate data collection device;
   receiving, by the computing device, failure related data associated with the primary data collection device after discontinuing use of the primary data collection device; and
   updating, by the computing device, a hazard function based on the failure related data, wherein the hazard function is used to detect future failures of a same type of primary data collection device.

2. The method of claim 1, further comprising monitoring, by the computing device, at least one of cadence signals and SOS signals from the primary data collection device, wherein the detecting the failure event is based on the monitoring.

3. The method of claim 2, wherein the detecting the failure event comprises determining that the cadence signals deviate from an expected pattern or timing or duration.

4. The method of claim 1, wherein the detecting the failure event is based on the hazard function.

5. The method of claim 4, wherein the receiving the failure related data after discontinuing use of the primary data collection device includes receiving at least one of cadence signals and SOS signals from the primary data collection device that indicate that primary data collection device has failed.

6. The method of claim 1, wherein the one alternate data collection device is selected from the plurality of detected or available alternate data collection devices based on at least one selected from the group consisting of:
 proximity of the alternate data collection device to the primary data collection device;
 user permission settings to collect data;
 data collection capabilities of the alternate data collection device;
 social networking status of the alternate data collection device; and
 location of the alternate data collection device in relation to a geofenced area.

7. The method of claim 1, wherein the primary data collection device includes at least one of:
 an Internet-of-Things (IoT) device;
 a Machine-to-Machine (M2M) device;
 an environmental sensor;
 an object sensor;
 a proximity sensor; and
 a fluid sensor.

8. The method of claim 1, further comprising:
 detecting the presence of a replacement primary data collection device after selecting the alternate data collection device;
 discontinuing the use of the alternate data collection device; and
 beginning the use of the replacement primary data collection device after discontinuing the use of the alternate data collection device.

9. The method of claim 1, further comprising:
 detecting that the alternate data collection device is no longer available to collect data; and
 selecting another alternate data collection device based on the detecting that the alternate data collection device is no longer available.

10. The method of claim 1, wherein a service provider at least one of creates, maintains, deploys and supports the computing device.

11. The method of claim 1, wherein the detecting the failure event for a primary data collection device, the discontinuing the use of the primary data collection device, the selecting the alternate data collection device, the receiving the data collected by the alternate data collection device, the receiving the failure related data associated with the primary data collection device after discontinuing use of the primary data collection device, and the updating the hazard function are provided by a service provider on a subscription, advertising, and/or fee basis.

12. The method of claim 1, wherein the computing device includes software provided as a service in a cloud environment.

13. The method of claim 1, further comprising deploying a system for proactively detecting the failure of the primary data collection device, comprising providing a computer infrastructure operable to perform the detecting the failure event for a primary data collection device, the discontinuing the use of the primary data collection device, the selecting the alternate data collection device, the receiving the data collected by the alternate data collection device, the receiving the failure related data associated with the primary data collection device after discontinuing use of the primary data collection device, and the updating the hazard function.

14. A computer program product for proactively detecting failure of a primary data collection device, the computer program product comprising a computer readable storage medium having program instructions embodied therewith, the program instructions executable by a computing device to cause the computing device to:
 monitor failure related data associated with a primary data collection device that is currently collecting sensor data;
 generate a hazard function based on the monitoring the failure related data;
 detect a failure event for the primary data collection device based on the hazard function;
 discontinue use of the primary data collection device based on the detecting the failure event;
 select an alternate data collection device to collect data from a plurality of detected or available alternate data collection devices based on the discontinuing the use of the primary data collection device;
 receive sensor data collected by the alternate data collection device;
 continue to monitor and receive failure related data associated with the primary data collection device after discontinuing use of the primary data collection device; and
 update the hazard function based on the failure related data.

15. The computer program product of claim 14, wherein the monitoring the failure related data includes monitoring at least one of cadence signals or SOS signals from the primary data collection device.

16. The computer program product of claim 15, wherein the detecting the failure event comprises determining that the cadence signals deviate from an expected pattern or timing.

17. The computer program product of claim 14, wherein the alternate data collection device is selected from the plurality of detected alternate data collection devices based on at least one selected from the group consisting of:
 proximity of the alternate data collection device to the primary data collection device;
 user permission settings to collect data;
 data collection capabilities of the alternate data collection device;
 social networking status of the alternate data collection device; and
 location of the alternate data collection device in relation to a geofenced area.

18. The computer program product of claim 14, wherein the program instructions further cause the computing device to:
 detect the presence of a replacement primary data collection device after selecting the alternate data collection device;
 discontinue the use of the selected alternate data collection device; and
 begin the use of the replacement primary data collection device after discontinuing the use of the alternate data collection device.

* * * * *